US012646857B2

(12) United States Patent
Rowell

(10) Patent No.: US 12,646,857 B2
(45) Date of Patent: Jun. 2, 2026

(54) ANTENNA AND ANTENNA SYSTEM

(71) Applicant: Rohde & Schwarz GmbH & Co. KG, Munich (DE)

(72) Inventor: Corbett Rowell, Prien am Chiemsee (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 150 days.

(21) Appl. No.: 18/371,916

(22) Filed: Sep. 22, 2023

(65) Prior Publication Data

US 2024/0136733 A1 Apr. 25, 2024
US 2024/0235053 A9 Jul. 11, 2024

(30) Foreign Application Priority Data

Oct. 20, 2022 (EP) .................................... 22202634

(51) Int. Cl.
*H01Q 19/13* (2006.01)
*H01Q 3/24* (2006.01)
*H01Q 13/02* (2006.01)

(52) U.S. Cl.
CPC ............. *H01Q 19/132* (2013.01); *H01Q 3/24* (2013.01); *H01Q 13/02* (2013.01)

(58) Field of Classification Search
CPC ........ H01Q 19/132; H01Q 3/24; H01Q 13/02; H01Q 9/40; H01Q 9/32; H01Q 5/307; H01Q 19/13; H01Q 21/061; H01Q 21/205; H01Q 21/28; H01Q 1/36; H01Q 1/246; H01Q 5/25; H01Q 1/50; H01Q 15/16; H01Q 19/12
See application file for complete search history.

(56) References Cited

U.S. PATENT DOCUMENTS 3,009,154 A * 11/1961 Weimar, Jr. .......... H01Q 19/134 343/848
5,038,152 A * 8/1991 Wong ..................... H01Q 19/08 343/834
5,192,827 A 3/1993 Jasper, Jr.
5,316,051 A 5/1994 Zenoni et al.
6,170,457 B1 1/2001 Grajkowski
(Continued)

FOREIGN PATENT DOCUMENTS

CN 114583458 A 6/2022
GB 885942 A 1/1962
(Continued)

OTHER PUBLICATIONS

Office Action for related European Patent Application No. 22202634.6-1205, dated Mar. 17, 2023, 21 pages.
(Continued)

*Primary Examiner* — Dameon E Levi
*Assistant Examiner* — Jordan E. DeWitt
(74) *Attorney, Agent, or Firm* — DITTHAVONG, STEINER, & MLOTKOWSKI

(57) ABSTRACT

An antenna (10) is provided. Said antenna (10) comprises a monocone feed (11*a*) for inputting an input signal and/or outputting an output signal, and a reflecting surface (12*a*) comprising a parabolic shape for transmitting the input signal as an electromagnetic output wave and/or receiving an electromagnetic input wave as the output signal.

14 Claims, 5 Drawing Sheets

(56) References Cited

U.S. PATENT DOCUMENTS

| | | | | |
|---|---|---|---|---|
| 6,956,534 | B2 * | 10/2005 | Hagiwara | H01Q 9/28<br>343/773 |
| 7,006,047 | B2 * | 2/2006 | Marsan | H01Q 1/28<br>343/773 |
| 10,050,752 | B1 * | 8/2018 | Bales | H01Q 3/242 |
| 10,177,434 | B1 * | 1/2019 | Sriram | H01Q 25/007 |
| 10,651,558 | B1 | 5/2020 | Hand et al. | |
| 11,532,874 | B2 * | 12/2022 | Jamaly | H01Q 9/40 |
| 12,206,173 | B1 * | 1/2025 | West | H01Q 3/20 |
| 2009/0047610 | A1 | 2/2009 | Teng | |
| 2010/0282066 | A1 | 11/2010 | Tankersley | |
| 2015/0311593 | A1 | 10/2015 | Fasenfest | |
| 2016/0006114 | A1 | 1/2016 | Jamaly | |
| 2016/0043472 | A1 * | 2/2016 | Fasenfest | H01Q 13/02<br>343/786 |
| 2016/0359237 | A1 * | 12/2016 | Quan | H01Q 21/24 |
| 2021/0320431 | A1 | 10/2021 | Wu et al. | |
| 2022/0087646 | A1 | 3/2022 | Capri et al. | |
| 2024/0136733 | A1 * | 4/2024 | Rowell | H01Q 3/24 |
| 2024/0283162 | A1 * | 8/2024 | Rowell | H01Q 9/40 |

FOREIGN PATENT DOCUMENTS

| | | | |
|---|---|---|---|
| GB | 1016741 | A | 1/1966 |
| SU | 974005 | A1 | 11/1982 |
| WO | 9532017 | A1 | 11/1995 |
| WO | 15155772 | A1 | 10/2015 |

OTHER PUBLICATIONS

Office Action for related European Patent Application No. 22202634. 6-1205, dated Jun. 20, 2023, 13 pages.

* cited by examiner

ANTENNA AND ANTENNA SYSTEM

This patent application claims priority to European Patent Application No. 22 202 634.6, "Antenna and Antenna System," filed Oct. 20, 2022, the contents of which are incorporated herein by reference in their entirety.

The invention relates to an antenna and an antenna system.

Generally, in times of an increasing number of communication applications providing wireless connectivity possibilities, there is a growing need of an antenna and an antenna system for performing measurements with respect to such applications in order to verify their correct functioning in an efficient and accurate manner, whereby a high flexibility is ensured due to wideband capabilities of said antenna or antenna system, respectively.

US 2016/0006114 A1 relates to methods and systems for low-profile or hidden antennas, and for installation and use of such antennas in particular locations, such as surfaces of roadways, pavements, walls, and/or ceilings. An example antenna system comprises a ground conductor configured to provide a ground plane for the antenna system, where the ground conductor comprises a recess, a monocone arranged in the recess of the ground conductor, and a conductive coupling between the monocone and the ground conductor to ground the monocone. However, in accordance with said document or the corresponding configuration, respectively, wideband capabilities cannot be provided, which disadvantageously leads to a limited flexibility, thereby also reducing efficiency and accuracy.

Accordingly, there is the object to provide an antenna and an antenna system in order to allow for performing measurements, especially measurements regarding wireless connectivity capabilities, in a flexible manner, thereby ensuring a high accuracy and efficiency of the measurement.

This object is solved by the features of claim 1 for an antenna and the features of claim 14 for an antenna system. The dependent claims contain further developments.

According to a first aspect of the invention, an antenna is provided. Said antenna comprises a monocone feed for inputting an input signal and/or outputting an output signal, and a reflecting surface comprising a parabolic shape for transmitting the input signal as an electromagnetic output wave and/or receiving an electromagnetic input wave as the output signal. Advantageously, wideband capabilities can be provided, thereby ensuring a high flexibility, efficiency and accuracy. Further advantageously, performance, especially a radiation pattern, of said antenna does not suffer when a flat metal surface is placed directly above or below said antenna.

According to a first preferred implementation form of the first aspect of the invention, the parabolic shape comprises or is a two-dimensional parabolic shape. Advantageously, for instance, the reflecting surface is independent of frequency or wavelength, respectively, thereby increasing flexibility, and thus also efficiency.

According to a second preferred implementation form of the first aspect of the invention, the reflecting surface is sandwiched between two planar surfaces. Advantageously, for example, a cavity can be formed, wherein the monocone feed is located inside said cavity, thereby providing a kind of cavity antenna especially without the typical disadvantage of a narrow bandwidth.

According to a further preferred implementation form of the first aspect of the invention, the monocone feed is placed at a focal line of the reflecting surface. Advantageously, for instance, an in-phase arrival of all reflections from a plane wave can be ensured.

According to a further preferred implementation form of the first aspect of the invention, the monocone feed is offset from a focal line and/or a focal point of the reflecting surface. Advantageously, for example, the antenna can be designed in accordance with a desired phase of arrival in an efficient manner.

According to a further preferred implementation form of the first aspect of the invention, the reflecting surface is arranged with respect to the monocone feed such that all reflections from a plane wave to the corresponding center of the monocone feed at the respective focal point have the same path length. Advantageously, for instance, all reflections arrive in phase.

According to a further preferred implementation form of the first aspect of the invention, the antenna comprises or is a wideband and/or directional antenna. Advantageously, for example, said antenna can be operational up to 20 GHz, thereby further increasing flexibility.

According to a further preferred implementation form of the first aspect of the invention, the antenna comprises or is a lightweight and/or low-profile antenna. Advantageously, for instance, about 70 percent reduction in physical volume in comparison with conventional antennas can be achieved, which leads to an increased flexibility.

According to a further preferred implementation form of the first aspect of the invention, the antenna further comprises at least one further monocone feed for inputting the input signal and/or outputting the output signal and/or for inputting a further input signal and/or outputting a further output signal, and at least one further reflecting surface each comprising a further parabolic shape for transmitting the input signal as the electromagnetic output wave and/or receiving the electromagnetic input wave as the output signal and/or for transmitting the further input signal as a further electromagnetic output wave and/or receiving a further electromagnetic input wave as the further output signal. Advantageously, for example, said antenna can be used with respect to different directions in a particularly efficient and accurate manner especially at the same time and without the need of moving said antenna.

According to a further preferred implementation form of the first aspect of the invention, the monocone feed, the reflecting surface, the at least one further monocone feed, and the at least one further reflecting surface are arranged to form a directional array, especially a switched directional array. Advantageously, for instance, error and drive times can be reduced especially in Time Difference of Arrival (TDoA) systems.

According to a further preferred implementation form of the first aspect of the invention, the monocone feed, the reflecting surface, the at least one further monocone feed, and the at least one further reflecting surface are arranged in a circular manner. Advantageously, for example, complexity can be reduced, thereby increasing efficiency.

According to a further preferred implementation form of the first aspect of the invention, the at least one further monocone feed are three further monocone feeds and the at least one further reflecting surface are three further reflecting surfaces, wherein the monocone feed and the three further monocone feeds substantially form the corners of an imaginary square. Advantageously, for instance, said antenna can be employed with respect to four major directions of interest in an efficient and accurate manner.

According to a further preferred implementation form of the first aspect of the invention, the antenna further comprises at least one object, preferably at least one metallic object, more preferably at least one grounded metallic object, arranged in the vicinity of the reflecting surface especially for directing the electromagnetic output wave and/or the electromagnetic input wave. Advantageously, for example, directional characteristic of said antenna can efficiently be adapted.

According to a second aspect of the invention, an antenna system is provided. Said antenna system comprises an antenna according to the first aspect of the invention or any of its preferred implementation forms, respectively, and at least one additional monocone feed or at least one additional antenna. In this context, the antenna is arranged underneath, especially underneath a ground plane of, the at least one additional monocone feed or the at least one additional antenna. Advantageously, wideband capabilities can be provided, thereby ensuring a high flexibility, efficiency and accuracy. Further advantageously, performance, especially a radiation pattern, of said antenna system does not suffer when a flat metal surface is placed directly above or below said antenna system.

According to a first preferred implementation form of the second aspect of the invention, the at least one additional antenna comprises or is at least one antenna according to the first aspect of the invention or any of its preferred implementation forms, respectively. In addition to this or as an alternative, the antenna and the at least one additional monocone feed are arranged such that the respective feeding points of the antenna and the at least one additional monocone feed are substantially oriented in the same direction. Alternatively, the antenna and the at least one additional antenna are arranged such that the respective feeding points of the antenna and the at least one additional antenna are substantially oriented in the same direction. Advantageously, for instance, complexity can be reduced, thereby increasing efficiency.

Exemplary embodiments of the invention are now further explained with respect to the drawings by way of example only, and not for limitation. In the drawings.

Figure 1:
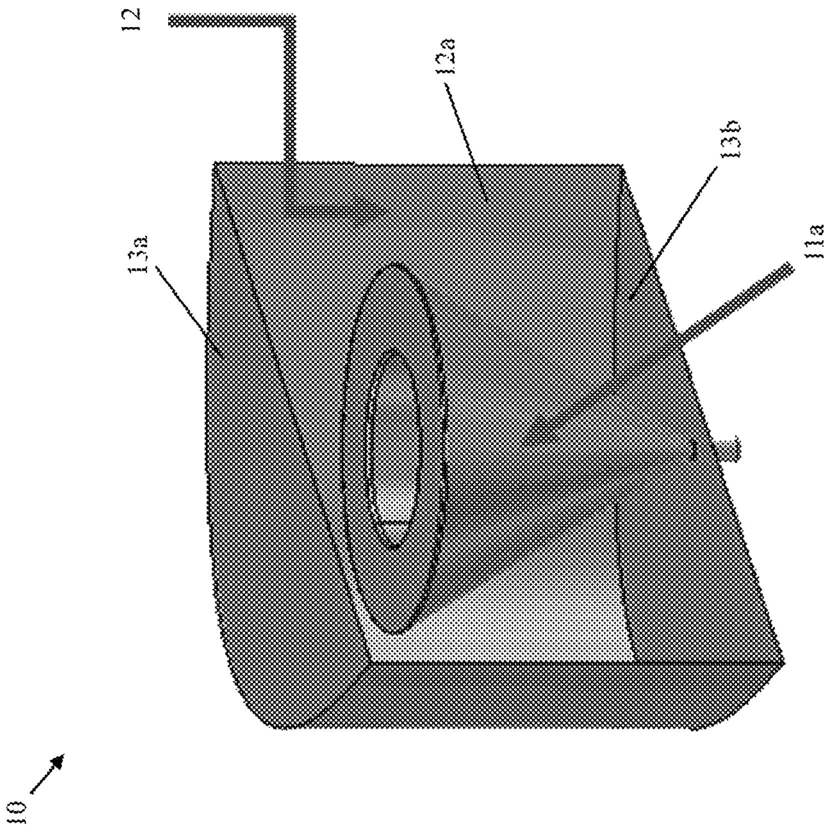
FIG. 1 shows an exemplary embodiment of an inventive antenna.

Firstly, with respect to FIG. 1 an exemplary embodiment 10 of an antenna in the sense of the invention is illustrated.

Said antenna 10 comprises a monocone feed 11*a* for inputting an input signal and/or outputting an output signal, and a reflecting surface 12*a* comprising a parabolic shape for transmitting the input signal as an electromagnetic output wave and/or receiving an electromagnetic input wave as the output signal.

As it can further be seen from FIG. 1, the parabolic shape is a two-dimensional parabolic shape. Additionally, the reflecting surface 12*a* is sandwiched between two planar surfaces 13*a*, 13*b*.

It is noted that the reflecting surface 12 and said two planar surfaces 13*a*, 13*b* especially form a cavity. Preferably, the above-mentioned monocone feed 11*a* is located inside said cavity.

Figure 2:
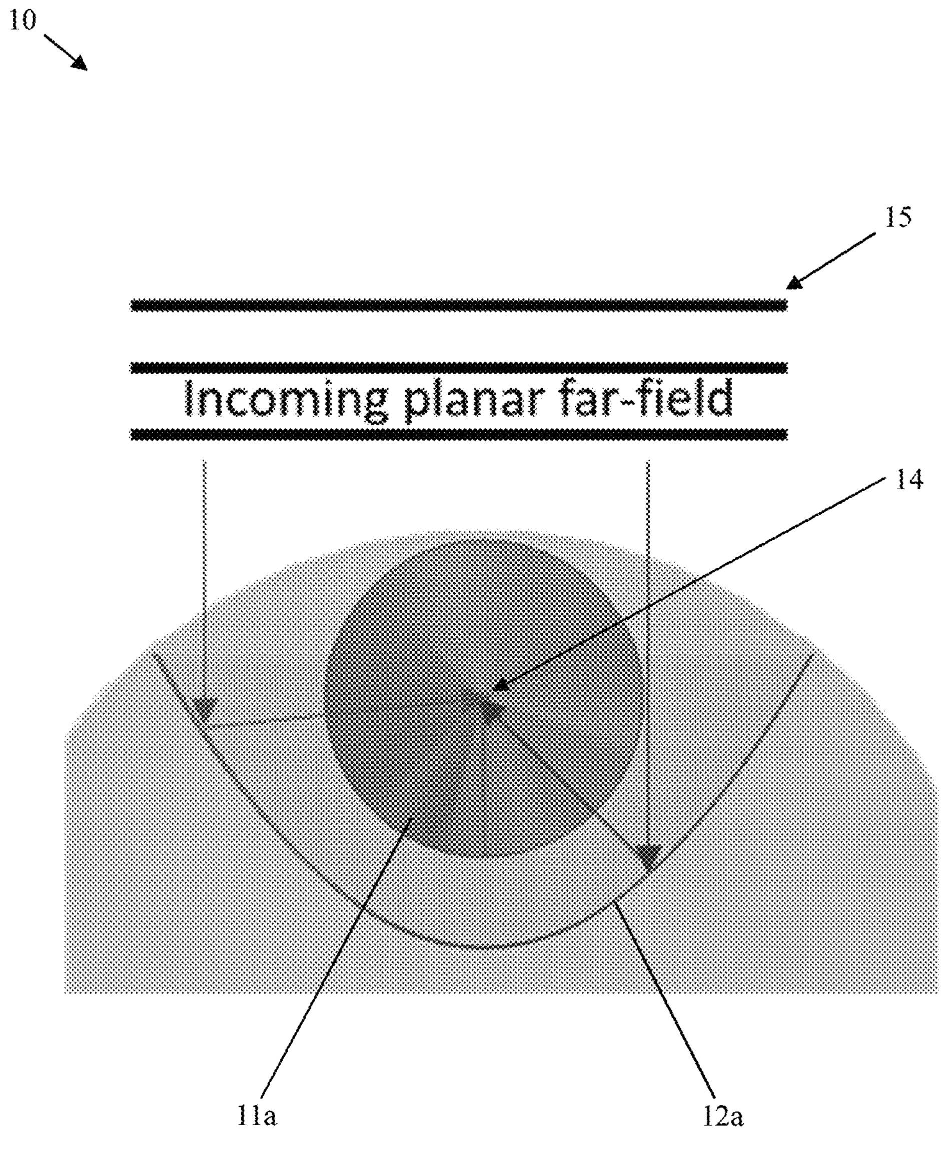
FIG. 2 shows a top view of the exemplary embodiment according to FIG. 1.

Furthermore, in accordance with FIG. 2 depicting a top view of the antenna 10 of FIG. 1, the monocone feed 11*a* is placed at a focal line 14 of the reflecting surface 12*a*. In this context, it is noted that the above-mentioned planar surfaces 13*a*, 13*b* are substantially perpendicular to said focal line 14.

It is further noted that the term "substantially perpendicular" is especially to be understood as an angle between 80 degrees and 100 degrees, preferably between 85 degrees and 95 degrees, more preferably between 88 degrees and 92 degrees, most preferably between 89.5 degrees and 90.5 degrees.

Moreover, especially as an alternative, the monocone feed 11*a* can be offset from a focal line, such as the above-mentioned focal line 14, and/or a focal point of the reflecting surface 12*a*.

In this context, the term "offset" is especially to be understood as deviating from said focal line and/or said focal point of the reflecting surface 12*a* not more than 20 percent, preferably 10 percent, more preferably 5 percent, most preferably 1 percent, of the corresponding smallest or largest diameter of the monocone feed 11*a*.

As it can further be seen from FIG. 2, the reflecting surface 12*a* is arranged with respect to the monocone feed 11*a* such that all reflections from a plane wave, exemplarily illustrated by an incoming planar far-field 15, to the corresponding center, exemplarily being equivalent to the focal line 14, of the monocone feed 11*a* at the respective focal point have the same path length. In this context, it is noted that all reflections advantageously arrive in phase especially due to said configuration.

It is noted that the antenna 10 can be implemented as a wideband and/or directional antenna. Additionally or alternatively, the antenna 10 can be implemented as a lightweight and/or low-profile antenna.

In this context, the term "wideband" is especially to be understood as a multi-octave frequency bandwidth.

Figure 3:
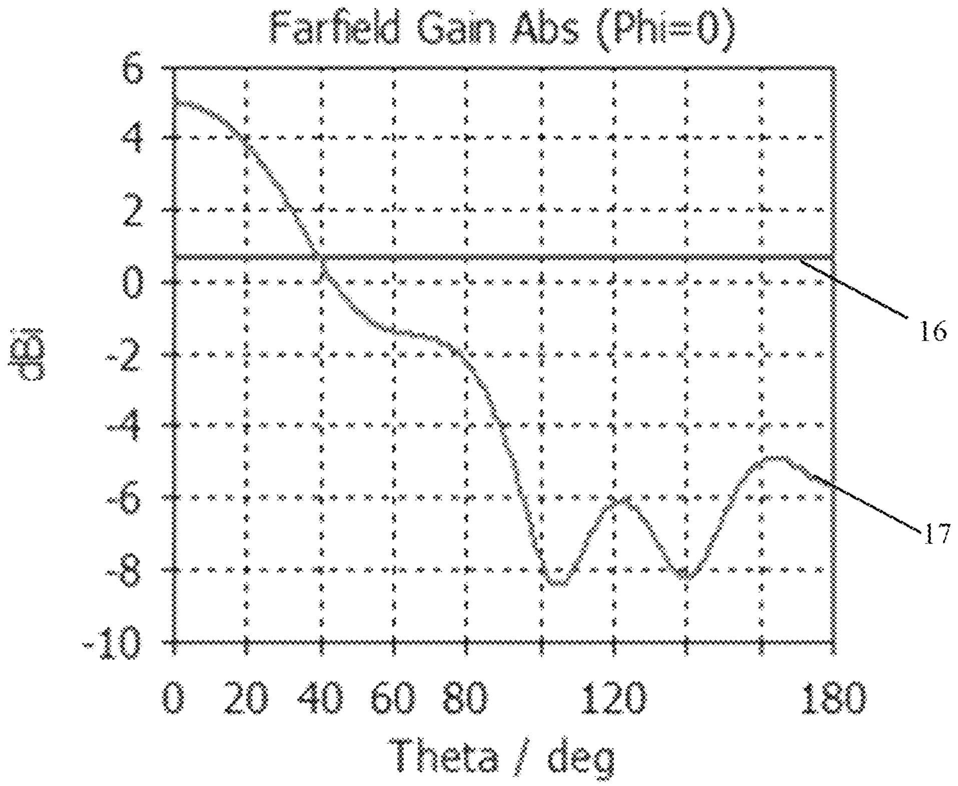
FIG. 3 illustrates a comparison of a monocone antenna with an inventive antenna in the context of absolute far-field gain.

With special respect to said directional antenna, it is noted that FIG. 3 illustrates a comparison of the directional characteristic 16 of an monocone antenna with the directional characteristic 17 of an inventive antenna such as the antenna 10 of FIG. 1 or FIG. 2, respectively.

In general, it is noted that it might be particularly advantageous if an antenna in the sense of the invention is used for base-station estimation and/or spectrum and mobile network monitoring and/or critical infrastructure monitoring. Additionally or alternatively, such an inventive antenna can be used in a switched directional array especially to reduce error and drive times in TDoA (Time Difference of Arrival) systems.

Especially in this context, an antenna in the sense of the invention is advantageously low cost, much smaller, exemplarily 70 percent reduction in physical volume, and wideband, exemplarily operational up to 20 GHz.

Furthermore, with respect to the above-mentioned reflecting surface 12*a*, it is to be pointed out that said reflecting surface 12*a* is especially independent of frequency or wavelength, respectively. It is further noted that the above-mentioned monocone feed 11*a* is extremely wideband. As a further advantage, inventively, this results in an antenna that is both directional and wideband with little performance degradation, for instance, when placed on top of large metal surfaces.

Figure 4:
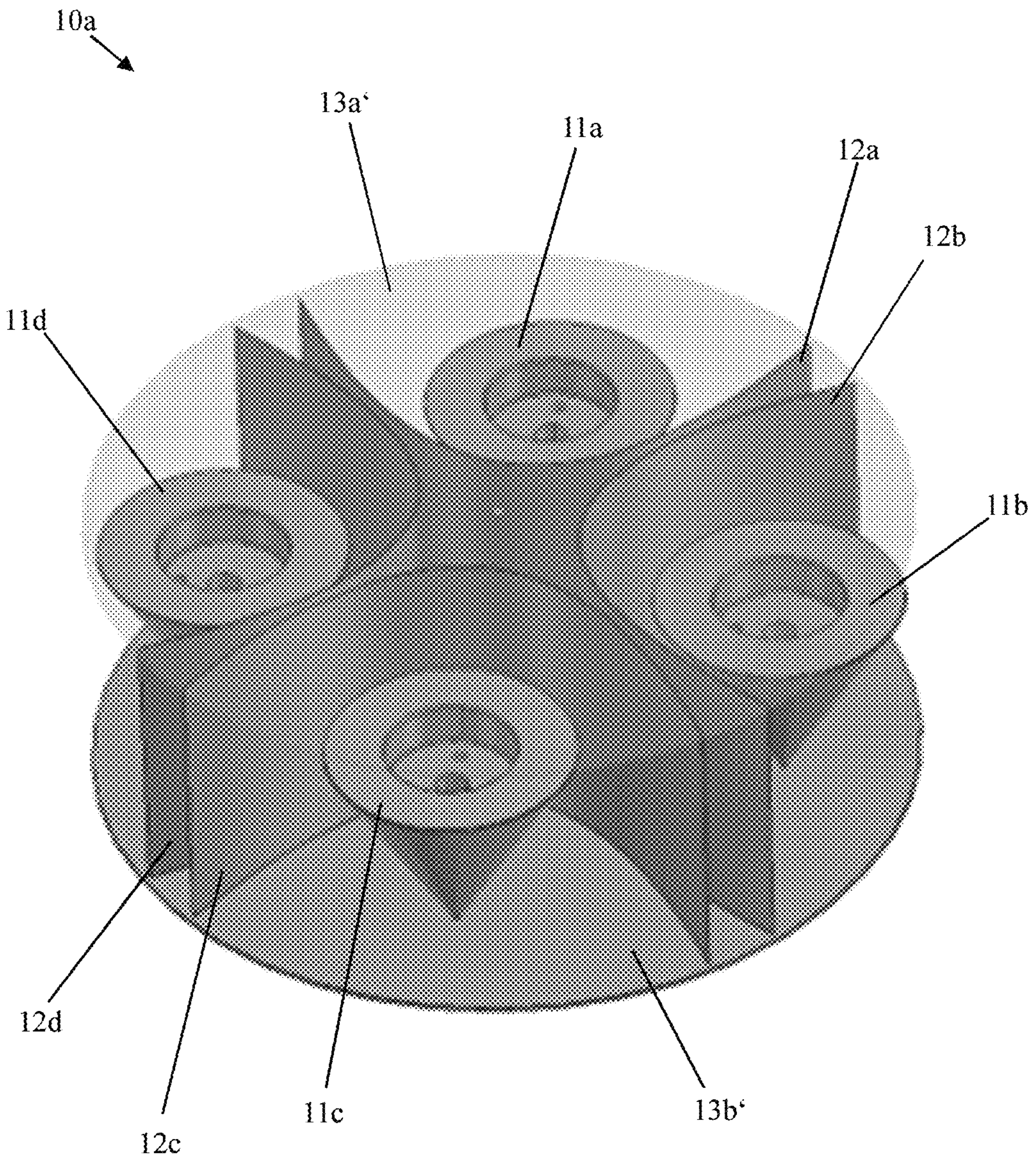
FIG. 4 shows a further exemplary embodiment of an inventive antenna.

Now, with respect to FIG. 4, a further exemplary embodiment 10*a* of an inventive antenna, exemplarily being based on the antenna 10 of FIG. 1 or FIG. 2, respectively, is illustrated.

Said antenna 10*a* further comprises at least one further monocone feed, exemplarily three further monocone feeds 11*b*, 11*c*, 11*d* for inputting the input signal and/or outputting the output signal and/or for inputting a further input signal and/or outputting a further output signal, and at least one further reflecting surface, exemplarily three further reflecting surfaces 12*b*, 12*c*, 12*d*, each comprising a further parabolic shape for transmitting the input signal as the electromagnetic output wave and/or receiving the electromagnetic input wave as the output signal and/or for transmitting the further input signal as a further electromagnetic output wave and/or receiving a further electromagnetic input wave as the further output signal.

It is noted that the explanations above, especially regarding the monocone feed 11*a* and the reflecting surface 12*a*, can analogously be applied for at least one, preferably each, of said further monocone feeds 11*b*, 11*c*, 11*d* and said further reflecting surfaces 12*b*, 12*c*, 12*d*.

It is further noted that it might be particularly advantageous if the monocone feed 11*a*, the reflecting surface 12*a*, the at least one further monocone feed, exemplarily the three further monocone feeds 11*b*, 11*c*, 11*d*, and the at least one further reflecting surface, exemplarily the three further reflecting surfaces 12*b*, 12*c*, 12*d*, are arranged to form a directional array, especially a switched directional array.

As it can further be seen from FIG. 4, the monocone feed 11*a*, the reflecting surface 12*a*, the at least one further monocone feed, exemplarily the three further monocone feeds 11*b*, 11*c*, 11*d*, and the at least one further reflecting surface, exemplarily the three further reflecting surfaces 12*b*, 12*c*, 12*d*, are arranged in a circular manner.

In addition to this, the planar surfaces 13*a*', 13*b*', to which the above-mentioned corresponding explanations especially apply in an analogous manner, are of circular shape and/or of the same size.

It is further noted that the monocone feed 11*a* and the three further monocone feeds 11*b*, 11*c*, 11*d* substantially form the corners of an imaginary square. In other words, an angle between two neighboring ones of said monocone feeds 11*a*, 11*b*, 11*c*, 11*d* is between 80 degrees and 100 degrees, preferably between 85 degrees and 95 degrees, more preferably between 88 degrees and 92 degrees, most preferably between 89.5 degrees and 90.5 degrees.

With respect to the antenna 10 of FIG. 1 or FIG. 2, respectively, and the antenna 10*a* of FIG. 4, it is noted that it might be particularly advantageous if the antenna 10 or 10*a*, respectively, further comprises at least one object, preferably at least one metallic object, more preferably at least one grounded metallic object, arranged in the vicinity of the reflecting surface 12*a* or the further reflecting surfaces 12*b*, 12*c*, 12*d*, respectively, especially for directing the electromagnetic output wave and/or the electromagnetic input wave or the further electromagnetic output wave and/or the further electromagnetic input wave, respectively.

With respect to the above-mentioned vicinity, it is noted that said vicinity may preferably refer to the corresponding volume of the above-mentioned cavity.

Figure 5:
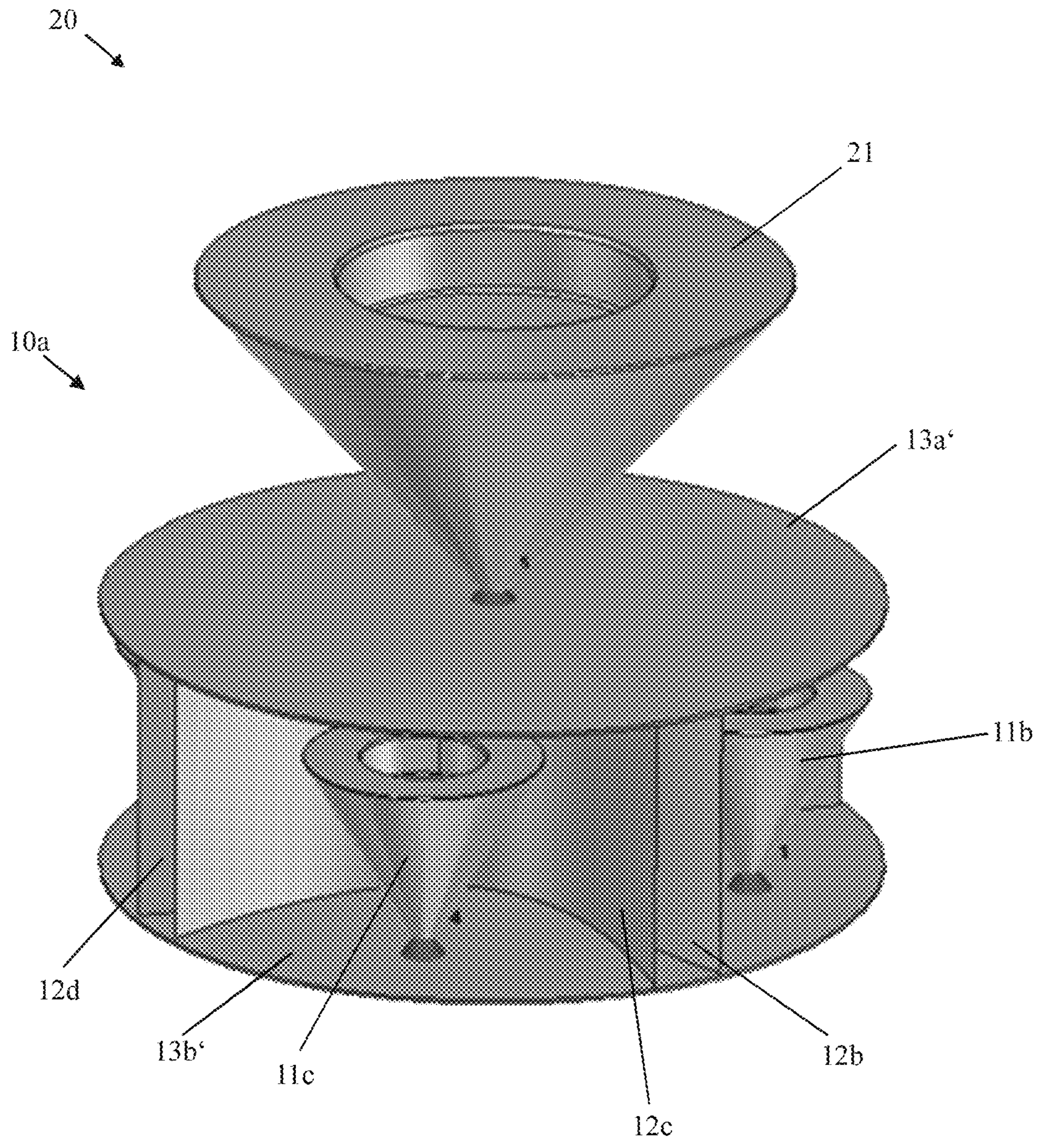
FIG. 5 shows an exemplary embodiment of an inventive antenna system.

Finally, FIG. 5 depicts an exemplary embodiment 20 of an inventive antenna system.

Said antenna system 20 comprises an antenna in the sense of the invention, exemplarily the antenna 10*a* of FIG. 4, and at least one additional monocone feed, exemplarily the additional monocone feed 21.

In this context, the antenna 10*a* is arranged underneath, especially underneath a ground plane of, the additional monocone feed 21.

In this context, as it can further be seen from FIG. 5, the antenna 10*a* and the additional monocone feed 21 are arranged such that the respective feeding points of the antenna 10*a* and the additional monocone feed 21 are substantially oriented in the same direction. In other words, the respective apexes of the corresponding cone-shaped monocone feeds substantially point in the same direction.

In this context, the term "substantially" is especially to be understood as deviating not more than 10 degrees, preferably 5 degrees, more preferably 2 degrees, most preferably 0.5 degrees, from a certain direction.

It is noted that it might be particularly advantageous if the feeding point of the additional monocone 21 is located at the center of the circular-shaped surface 13*a*' or 13*b*', respectively.

It is further noted that the feeding point of the additional monocone 21 can be offset from the center of the circular-shaped surface 13*a*' or 13*b*', respectively.

In this context, the term "offset" is especially to be understood as deviating from said center not more than 20 percent, preferably 10 percent, more preferably 5 percent, most preferably 1 percent, of the corresponding diameter of the circular-shaped surface 13*a*' or 13*b*', respectively.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. An antenna comprising:

a monocone feed for inputting an input signal and/or outputting an output signal, and a reflecting surface comprising a parabolic shape for transmitting the input signal as an electromagnetic output wave and/or receiving an electromagnetic input wave as the output signal, wherein the reflecting surface is sandwiched between two planar surfaces, such that a cavity is formed in which the monocone feed is located.

2. The antenna according to claim 1, wherein the parabolic shape comprises or is a two-dimensional parabolic shape.

3. The antenna according to claim 1, wherein the monocone feed is placed at a focal line of the reflecting surface.

4. The antenna according to claim 1, wherein the monocone feed is offset from a focal line and/or a focal point of the reflecting surface.

5. The antenna according to claim 1, wherein the reflecting surface is arranged with respect to the monocone feed such that all reflections from a plane wave to the corresponding center of the monocone feed at the respective focal point have the same path length.

6. The antenna according to claim 1, wherein the antenna comprises or is a wideband and/or directional antenna.

7. The antenna according to claim 1, wherein the antenna comprises or is a lightweight and/or low-profile antenna.

8. The antenna according to claim 1, wherein the antenna further comprises:

at least one further monocone feed for inputting the input signal and/or outputting the output signal and/or for inputting a further input signal and/or outputting a further output signal, and at least one further reflecting surface each comprising a further parabolic shape for transmitting the input signal as the electromagnetic output wave and/or receiving the electromagnetic input wave as the output signal and/or for transmitting the further input signal as a further electromagnetic output wave and/or receiving a further electromagnetic input wave as the further output signal.

9. The antenna according to claim 8, wherein the monocone feed, the reflecting surface, the at least one further monocone feed, and the at least one further reflecting surface are arranged to form a directional array, especially a switched directional array.

10. The antenna according to claim 8, wherein the monocone feed, the reflecting surface, the at least one further monocone feed, and the at least one further reflecting surface are arranged in a circular manner.

11. The antenna according to claim 8, wherein the at least one further monocone feed are three further monocone feeds and the at least one further reflecting surface are three further reflecting surfaces, wherein the monocone feed and the three further monocone feeds substantially form the corners of an imaginary square.

12. The antenna according to claim 1, wherein the antenna further comprises at least one object, preferably at least one metallic object, more preferably at least one grounded metallic object, arranged in the vicinity of the reflecting surface especially for directing the electromagnetic output wave and/or the electromagnetic input wave.

13. An antenna system comprising:

an antenna comprising a monocone feed for inputting an input signal and/or outputting an output signal, and a reflecting surface comprising a parabolic shape for transmitting the input signal as an electromagnetic output wave and/or receiving an electromagnetic input wave as the output signal, wherein the reflecting surface is sandwiched between two planar surfaces, such that a cavity is formed in which the monocone feed is located; and at least one additional monocone feed or at least one additional antenna, wherein the antenna is arranged underneath, especially underneath a ground plane of, the at least one additional monocone feed or the at least one additional antenna.

14. The antenna system according to claim 13, wherein when the antenna system comprises at least one additional antenna, the at least one additional antenna comprises or is at least one antenna comprising at least one additional monocone feed for inputting the input signal and/or outputting the output signal, and at least one additional reflecting surface comprising the parabolic shape for transmitting the input signal as the electromagnetic output wave and/or receiving the electromagnetic input wave as the output signal; and/or wherein the antenna and the at least one additional monocone feed are arranged such that the respective feeding points of the antenna and the at least one additional monocone feed are substantially oriented in the same direction, or wherein the antenna and the at least one additional antenna are arranged such that the respective feeding points of the antenna and the at least one additional antenna are substantially oriented in the same direction.

* * * * *